US011797355B2

(12) United States Patent
Knaup et al.

(10) Patent No.: US 11,797,355 B2
(45) Date of Patent: *Oct. 24, 2023

(54) RESOLVING CLUSTER COMPUTING TASK INTERFERENCE

(71) Applicant: D2iQ, Inc., San Francisco, CA (US)

(72) Inventors: Tobias Günter Knaup, San Francisco, CA (US); Christopher John Barkley Gutierrez, San Mateo, CA (US)

(73) Assignee: D2iQ, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,030

(22) Filed: Jul. 11, 2022

(65) Prior Publication Data

US 2022/0391262 A1 Dec. 8, 2022

Related U.S. Application Data

(63) Continuation of application No. 16/936,069, filed on Jul. 22, 2020, now Pat. No. 11,416,310, which is a continuation of application No. 15/903,912, filed on Feb. 23, 2018, now Pat. No. 10,761,902.

(51) Int. Cl.
*G06F 9/50* (2006.01)

(52) U.S. Cl.
CPC ...... *G06F 9/5088* (2013.01); *G06F 2209/505* (2013.01); *G06F 2209/508* (2013.01)

(58) Field of Classification Search
CPC .... G06F 9/5027; G06F 9/5061; G06F 11/203; G06F 11/3051; G06F 2209/501; G06F 2209/5011; G06F 2209/503; G06F 2209/504; G06F 2209/505; G06F 2209/509; G06F 9/5011; G06F 9/5083
See application file for complete search history.

(56) References Cited

U.S. PATENT DOCUMENTS

| 9,645,628 | B1* | 5/2017 | Loafman | G06F 9/5088 |
|---|---|---|---|---|
| 2008/0091806 | A1* | 4/2008 | Shen | G06F 9/5061 |
| | | | | 709/223 |
| 2010/0153958 | A1* | 6/2010 | Richards | G06F 9/5083 |
| | | | | 718/104 |
| 2012/0072765 | A1* | 3/2012 | Bower, III | G06F 11/2035 |
| | | | | 714/E11.071 |
| 2016/0085654 | A1* | 3/2016 | Khoury | G06F 13/10 |
| | | | | 710/17 |
| 2016/0212061 | A1* | 7/2016 | Birkestrand | H04L 67/1008 |
| 2016/0378570 | A1* | 12/2016 | Ljubuncic | G06F 9/5027 |
| | | | | 718/104 |
| 2017/0315838 | A1* | 11/2017 | Nidugala | H04L 43/0817 |

* cited by examiner

*Primary Examiner* — Dong U Kim
(74) *Attorney, Agent, or Firm* — Van Pelt, Yi & James LLP

(57) ABSTRACT

A system for resolving interference on a cluster computing system includes a processor. The processor is configured to determine whether a second worker system has resources available to run the first or second task; in response to determining that the second worker system has the resources available to run the second task, move the second task from the first to the second worker system; in response to determining that the second worker system has the resources available to run the first task and does not have resources available to run the second task, move the first task from the first to the second worker system; and in response to determining that the second worker system does not have the resources available to run the first or second task, limit a resource allocation of the first or second task.

18 Claims, 7 Drawing Sheets

RESOLVING CLUSTER COMPUTING TASK INTERFERENCE

CROSS REFERENCE TO OTHER APPLICATIONS

This application is a continuation of U.S. patent application Ser. No. 16/936,069, entitled RESOLVING CLUSTER COMPUTING TASK INTERFERENCE filed Jul. 22, 2020 which is incorporated herein by reference for all purposes, which is a continuation of U.S. patent application Ser. No. 15/903,912 entitled RESOLVING CLUSTER COMPUTING TASK INTERFERENCE filed Feb. 23, 2018, now U.S. Pat. No. 10,761,902 which is incorporated herein by reference for all purposes.

BACKGROUND OF THE INVENTION

A traditional cluster computing system comprises a plurality of worker systems running a set of tasks. Each worker system is capable of running several tasks at the same time. A worker system has a set of resources available (e.g., processors, memory, data storage, etc.), portions of which are allocated to the tasks it is running. In some cases, the allocation is done by the cluster system itself, and in other cases the host operating system might do its own allocation. However, the worker system has many resources with limited capacity that are shared between tasks and typically not all are allocated. Some resources are not typically bottlenecks to task performance and do not have their capacity allocated to tasks, instead tasks are allowed to consume an amount of the resource that is necessary for correct operation. In addition, for some resources it is hard to predict usage for a task and so setting a limit would be difficult. Also, the process of manually setting caps for all possible resources is burdensome to the user. For instance, network bandwidth, storage bandwidth, memory bandwidth, and processor cache do not typically have allocated limits assigned for each task. This can lead to a problem where multiple processes that are heavy consumers of these resources saturate the worker system resource capacity, causing the performance of other processes on the worker system to drop as a result.

BRIEF DESCRIPTION OF THE DRAWINGS

Various embodiments of the invention are disclosed in the following detailed description and the accompanying drawings.

DETAILED DESCRIPTION

Figure 1:
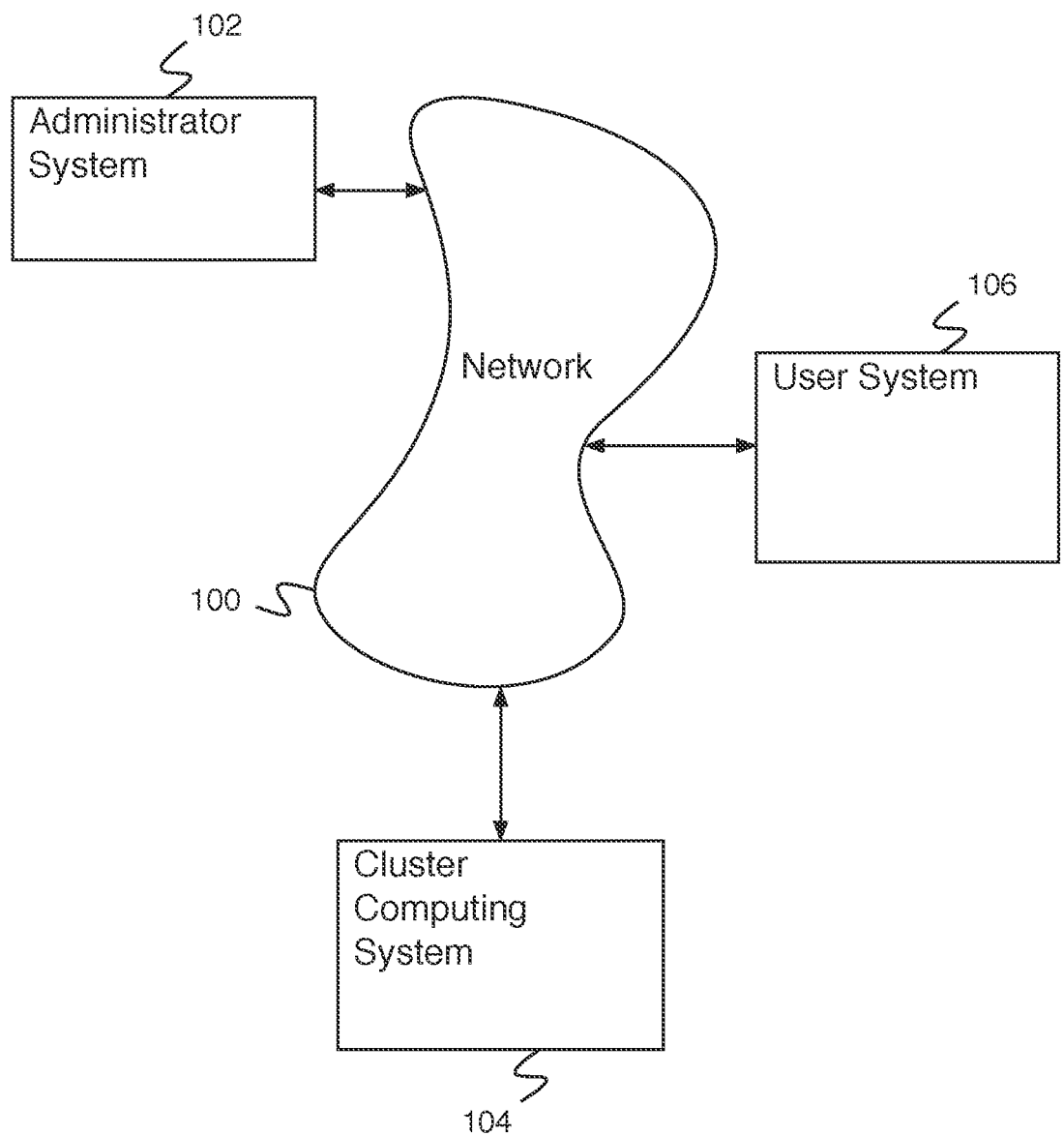
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for resolving interference on a cluster computing system comprises an input interface and a processor. The input interface is configured to receive an indication of a task interference on a first cluster machine of a plurality of cluster machines. The task interference comprises a reduction in performance of a first task when a second task is running concurrently on the first cluster machine. The processor is configured to determine whether a second cluster machine of the plurality of cluster machines has resources available to run the first task or the second task, and in the event it is determined that the second cluster machine has the resources available to run the first task, move the first task from the first cluster machine to the second cluster machine. The processor is additionally configured to, in the event it is determined that the second cluster machine has the resources available to run the second task and does not have the resources available to run the first task, move the second task from the first cluster machine to the second cluster machine. The processor is additionally configured to, in the event it is determined that the second cluster machine does not have the resources available to run the first task or the second task, limit the resource allocation of the first task or the second task. The system for resolving interference on a cluster computing system additionally comprises a memory coupled to the processor and configured to provide the processor with instructions. In some embodiments, in the event that both tasks have the same priority, the behavior described above is reversed. Since the second task started later and caused the interference, the system will try to move the second task if possible—in other words, in the event it is determined that the second cluster machine has the resources available to run the second task, move the second task from the first cluster machine to the second cluster machine; or in the event it is determined that the second cluster machine has the resources available to run the first task and does not have the resources available to run the second task, move the first task from the first cluster machine to the second cluster machine. In some embodiments, in the event that the tasks have priorities assigned, the task with lower priority will be tried first for being moved to another cluster machine.

A system for resolving interference on a cluster computing system comprises a system for receiving an indication that two tasks are interfering on a worker system of a cluster computing system and resolving the interference. The system resolves the interference by moving one of the two tasks to a different worker system of the cluster system, and if there is not a different worker system of the cluster system with the available resources to run the task, or if none of the tasks can be moved because they depend on resources only available on the first worker system, by limiting the resource usage of one or both of the tasks. In some embodiments, another way to resolve interference is to provision a new worker system to run the interfering task.

The resources of a cluster computing system that are the most in demand (e.g., processor capacity, memory) are typically allocated to tasks, and worker systems are only assigned tasks for which they have the resource capacity allocation available (e.g., if a task is allocated 2 processors and 4 GB of memory, a worker system is only assigned to run the task if it has 2 processors and 4 GB of memory that is not allocated to other tasks). However, the worker systems have many other resources with limited capacity that are typically not allocated—for example, network bandwidth, storage bandwidth, memory bandwidth, processor cache bandwidth, various processor caches such as data caches, instruction caches, and translation lookaside buffer (TLB), kernel resources like page cache, swap space, etc. If two processes that make heavy use of one of these resources are assigned to the same worker system, they can overwhelm the resource capacity and interfere, reducing the performance of both tasks. This interference is identifiable by a drop in resource utilization of a first task on a worker system at the same time as a second task starts on the worker system, when both tasks are using substantial portions of the worker system resource. Task interference can also be identified by monitoring performance of one or more key tasks running on the worker system or using performance indicators for the shared resource, such as CPU cache hit/miss or occupancy rates. The key tasks do not necessarily require a large amount of worker system resources, but are sensitive to resource performance. In the event task interference causes a worker system resource to be overwhelmed, the key task performance will suffer.

In response to the indication of task interference, the system for resolving task interference attempts to resolve the task interference by automatically moving one of the interfering tasks to another worker system. In some embodiments, the other worker systems of the computing cluster are checked in order from most loaded to least loaded, and the most loaded worker system with available capacity for the first task or the second task of the interfering tasks is determined. In some embodiments, the most loaded first strategy is not the optimal strategy—for example, for systems that do not support CPU cache isolation to get optimal performance out of the cache, the best strategy is to move to the least loaded machine. In those cases, the other worker systems of the computing cluster are checked in order from least loaded to most loaded, and the least loaded worker system with available capacity for the first task or the second task of the interfering tasks is determined. Note that a task's demand for shared resources is tracked and stored so that historic usage for resources can be used to help determine whether sufficient capacity is available. The task is then moved to the determined worker system. In the event no worker system has capacity for either of the interfering tasks, the resource usage of the tasks is limited to prevent the tasks from overwhelming the resource (e.g., and preventing all other tasks from functioning correctly).

The system for resolving interference on a cluster computing system additionally comprises a task interference database for storing the indication of task interference. When a task is initially assigned to a worker system, the task interference database is consulted, and in the event an interfering task is found, the system can avoid placing the task on a worker system already executing the interfering task. The task interference database contains resource usage history for all resources, allocated and un-allocated. In addition to the amount of resources in use, derived metrics are stored as well, such as network queueing delay, CPU cache hit/miss rates, I/O operations per second, etc. The database also stores various types of metadata about the task—for example which application it is part of, which user started it, the name and type of its environment (development, staging, production, etc.). The information persists after tasks finish execution so that usage profiles can be generated, and tasks can be classified into profiles, this allows the system to predict the usage profile of a new task based on past patterns. Usage profiles are built from the data using statistical methods and machine learning models. When a new task needs to be assigned to a worker system, the models are consulted to classify the task into the known usage profiles. In case the system has learned that the usage profile of the new task interferes with a usage profile of one or more tasks already executing on the worker system, it can avoid placing the new task on that worker system.

In some embodiments, the system reduces interference by various means depending on the resource. For example, network bandwidth can be limited by configuring a per-task network queueing discipline. In some embodiments, CPU cache utilization is limited by enabling per-task cache management technologies offered by the CPU. In some embodiments, storage bandwidth is limited by configuring per-task read/write throttling or proportionally weighted storage access time in a block I/O or storage controller. In some embodiments, interference on resources that are local to a processor core are remediated by pinning interfering tasks to different processor cores. In some embodiments, computation by a system is improved by reducing interference between executing tasks. Automatically dealing with task interference and maintaining a database of past task requirements, makes computation of current tasks more efficient by appropriately determining which resources should be provided for a task given the system configuration.

FIG. 1 is a block diagram illustrating an embodiment of a network system. In some embodiments, the network system of FIG. 1 comprises a system for efficient use of cluster computing resources. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, and user system 106 communicate via network 100. In the example shown, administrator system 102 comprises an administrator system for use by an administrator. In various embodiments, administrator system 102 comprises an administrator system for executing administrator commands, for executing jobs using cluster computing system 104, for creating jobs using cluster computing system 104, for querying the status of jobs on cluster computing system 104, or for any other appropriate administrator system purpose. Cluster computing system 104 comprises a cluster computing system for executing cluster computing jobs. In various embodiments, cluster computing system 104 comprises a computer, a multiprocessor computer, a plurality of computers, a plurality of multiprocessor computers, or any other appropriate cluster computing system. In some embodiments, cluster computing system 104 comprises a plurality of individual cluster systems. User system 106 comprises a user system for use by a cluster computing system user. A cluster computing system user requests jobs on cluster computing system 104 via user system 106. In some embodiments, a plurality of user request jobs via a plurality of user systems to be executed by one or more cluster computing systems. In various embodiments, individual users are assigned individual cluster systems, individual users are assigned individual computers within a cluster system, individual users share computers within a cluster system, or users are divided among cluster systems in any other appropriate way.

A user using user system 106 submits tasks to cluster computing system 104. The tasks run on cluster computing system 104 and the task usage of resources is monitored. Cluster computing system 104 comprises a system for resolving cluster computing task interference. The system for resolving cluster computing task interference comprises an input interface for receiving an indication of task interference on a first worker system. For example, the task interference (e.g., between a first task and a second task) is determined by observing a sudden drop in resource performance or a reduction in performance of key tasks. The system for resolving cluster computing task interference additionally comprises a processor configured to determine whether a second worker system of the plurality of worker systems has resources available to run the first task or the second task, and in the event it is determined that the second worker system has the resources available to run the first task, move the first task from the first worker system to the second worker system. The processor is additionally configured to, in the event it is determined that the second worker system has the resources available to run the second task and does not have the resources available to run the first task, move the second task from the first worker system to the second worker system. The processor is additionally configured to, in the event it is determined that the second worker system does not have the resources available to run the first task or the second task, limit a resource allocation of the first task or the second task. In some embodiments, instead of limiting a resource allocation, an additional worker machine is provisioned to run the first task or the second task.

Figure 2:
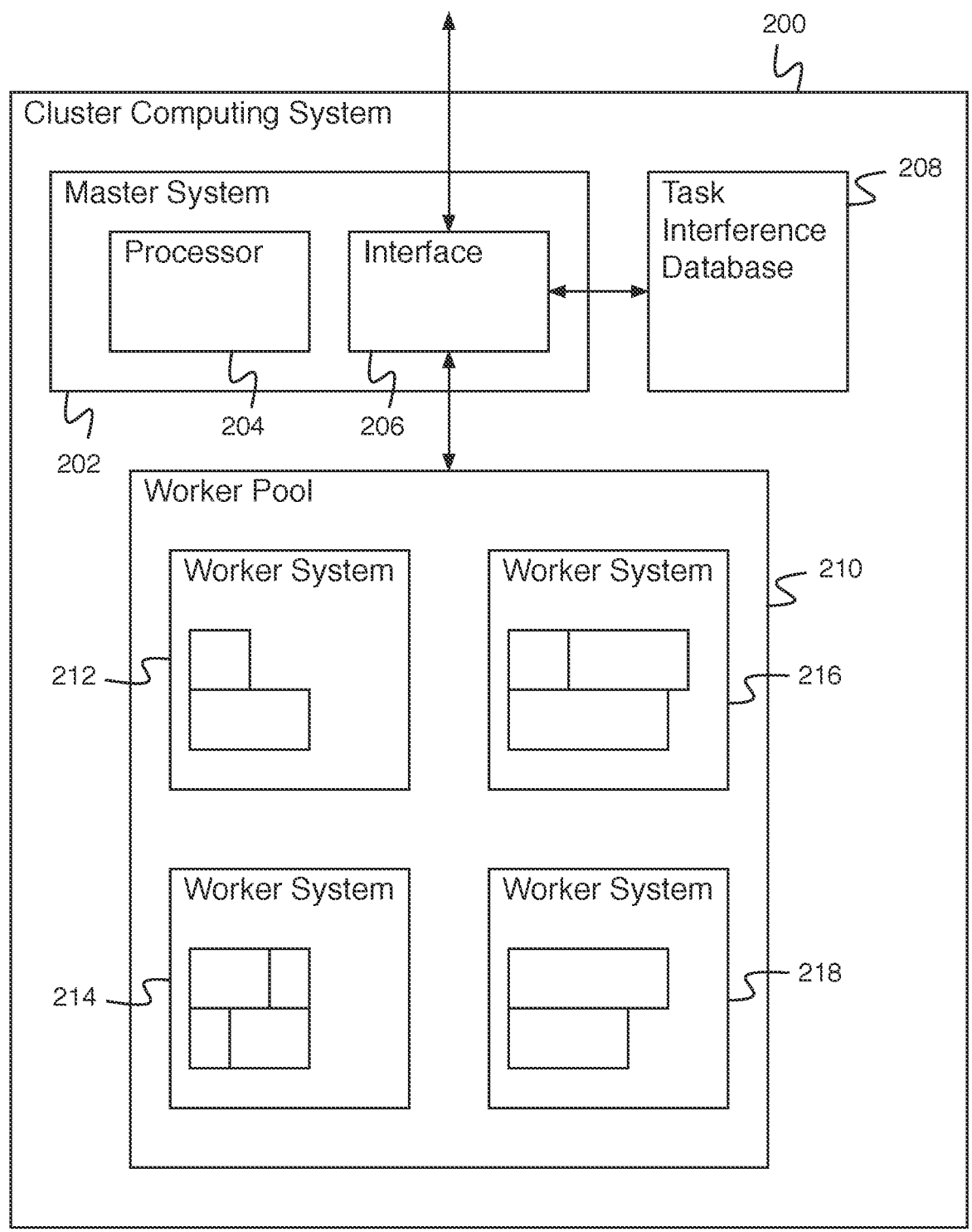
FIG. 2 is a block diagram illustrating an embodiment of a cluster computing system.

FIG. 2 is a block diagram illustrating an embodiment of a cluster computing system. In some embodiments, cluster computing system 200 comprises cluster computing system 104 of FIG. 1. In some embodiments, cluster computing system 200 comprises a system for resolving cluster computing task interference. In the example shown, cluster computing system 200 comprises master system 202. Master system 202 comprises processor 204 and interface 206. Master system 202 comprises a system for receiving an indication of a job to run, indicating to a worker system (e.g., a worker system of worker pool 210) to execute a task, for dividing a job into a set of tasks, for assembling a set of task results into a job result, for receiving an indication of a task interference (e.g., from worker pool 210), for determining whether other worker systems have resources to run a task that is interfering, for determining if a worker system has resources to run a task, for moving a task from a first worker system to a second worker system, for limiting a resource consumption of a task, etc.

In some cases, a task interference (e.g., between a first task and a second task) is determined by observing a drop in resource performance or a reduction in performance of key tasks. In some cases, task interference is determined by observing that peak resource usage cannot be handled even though a base load is satisfied by the available resources. The processor is configured to determine whether a second worker system of the plurality of worker systems has resources available to run the first task or the second task, and in the event it is determined that the second worker system has the resources available to run the first task, move the first task from the first worker system to the second worker system. The processor is additionally configured to, in the event it is determined that the second worker system has the resources available to run the second task and does not have the resources available to run the first task, move the second task from the first worker system to the second worker system. The processor is additionally configured to, in the event it is determined that the second worker system does not have the resources available to run the first task or the second task, limit a resource allocation of the first task or the second task.

In some embodiments, master system 202 comprises a system for receiving a performance target for a task of a set of tasks. Task interference database 208 comprises a task interference database for storing task interference information (e.g., indications of task interference, indications of tasks that are likely to interfere, indications of tasks that heavily utilize unallocated resources, etc.). In some embodiments, an indication of task interference is received from worker pool 210 and stored in task interference database 208. In some embodiments, task interference database is used for allocating tasks to worker systems of worker pool 210 with reduced interference (e.g., when a task is assigned to a worker system, task interference database 208 is checked for other tasks that the task is known to interfere with, and in the event another task is found, the task is not assigned to a worker system already running the other task). Worker pool 210 comprises a set of worker systems (e.g., worker system 212, worker system 214, worker system 216, worker system 218). Worker pool 210 comprises any appropriate number of worker systems (e.g., 1 worker system, 4 worker systems, 10 worker systems, 72 worker systems, etc.) and the number of worker systems can be increased or decreased as necessary. Each worker system runs a set of tasks utilizing a portion of its resource capacity.

Figure 3:
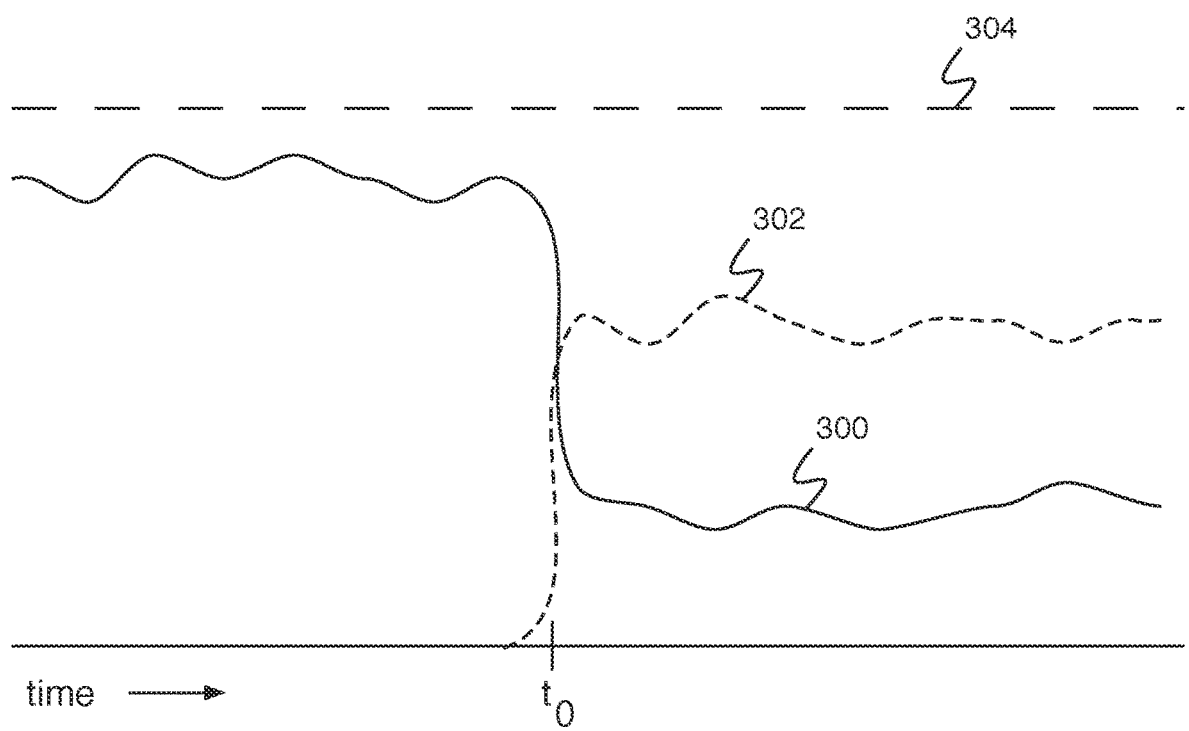
FIG. 3 is a diagram illustrating an embodiment of task interference.

FIG. 3 is a diagram illustrating an embodiment of task interference. In some embodiments, the task interference of FIG. 3 occurs on a worker system (e.g., a worker system of worker pool 210 of FIG. 2). In the example shown, line 300 represents resource usage by a first task and line 302 represents resource usage by a second task. The resource usage shown by line 300 and line 302 comprises a resource not typically allocated in a cluster system (e.g., network bandwidth, storage bandwidth, memory bandwidth, processor bandwidth, processor cache, etc.). Line 300 indicates usage near the worker system resource capacity (e.g., indicated by line 304). The worker system does not have enough resource capacity to support the needs of both tasks, so when the second task begins at time to, the resource usage of the first task drops rapidly. The resource usage of the second task never reaches the desired level. A resource usage of a first task dropping at the same time as a second task begins is a typical signal indicating task interference. In some cases, task interference is detected in a derivative metric such as cache hit/miss rate for CPU/kernel caches, not just the resource utilization itself. Other examples of derivative metrics include network queueing delay, I/O wait time, I/O operations per second.

Figure 4:
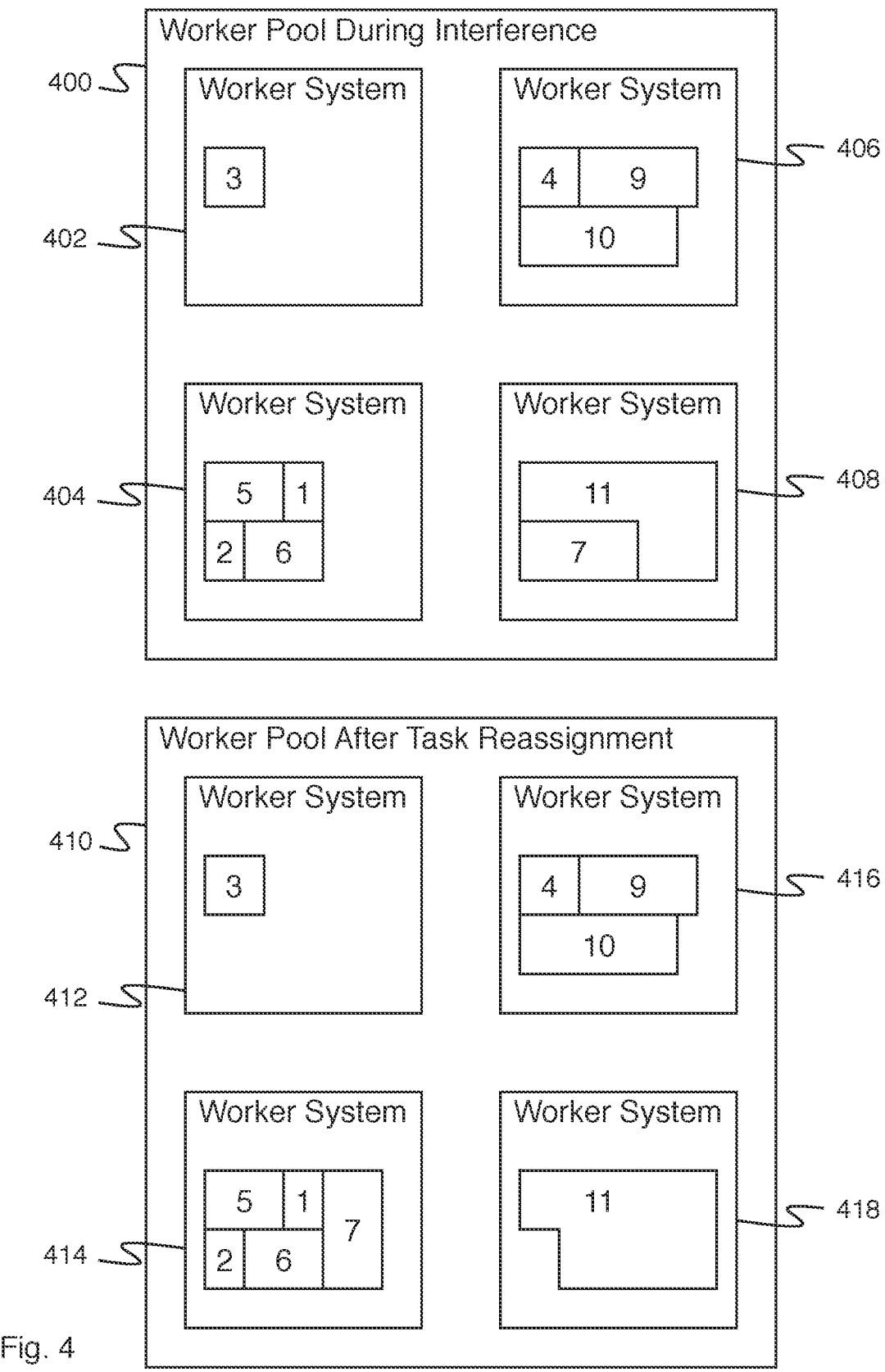
FIG. 4 is a diagram illustrating an embodiment of a worker pool during interference and after task reassignment.

FIG. 4 is a diagram illustrating an embodiment of a worker pool during interference and after task reassignment. In some embodiments, worker pool during interference 400 and worker pool after task reassignment 410 comprise instances of worker pool 210 of FIG. 2. In the example shown, worker pool during interference 400 comprises worker system 402, worker system 404, worker system 406, and worker system 408. Each worker system is running one or more tasks of a set of tasks. Each task running is represented by a box within the worker system, the size of the box representing the amount of resources used. In the example shown, the resource indicated comprises the same resource indicated by line 300 and line 302 of FIG. 3. Worker system 408 comprises two tasks (e.g., task 7 and task 11) that are interfering (e.g., using all available resources). Worker pool after task reassignment 410 comprises worker pool during interference 400 after a task reassignment process. Worker system 412 corresponds to worker system 402 after the task reassignment process has been executed, worker system 414 corresponds to worker system 404 after the task reassignment process has been executed, worker system 416 corresponds to worker system 406 after the task reassignment process has been executed, and worker system 418 corresponds to worker system 408 after the task reassignment process has been executed. Task 7 is seen running on worker system 408 before task reassignment and on worker system 414 after task reassignment. Task 11 is seen to utilize more resources on worker system 418 after task reassignment than on worker system 408 before task reassignment. Worker system 414 was chosen as the recipient of task 7 as it is the most loaded system with resources available for task 7.

Figure 5:
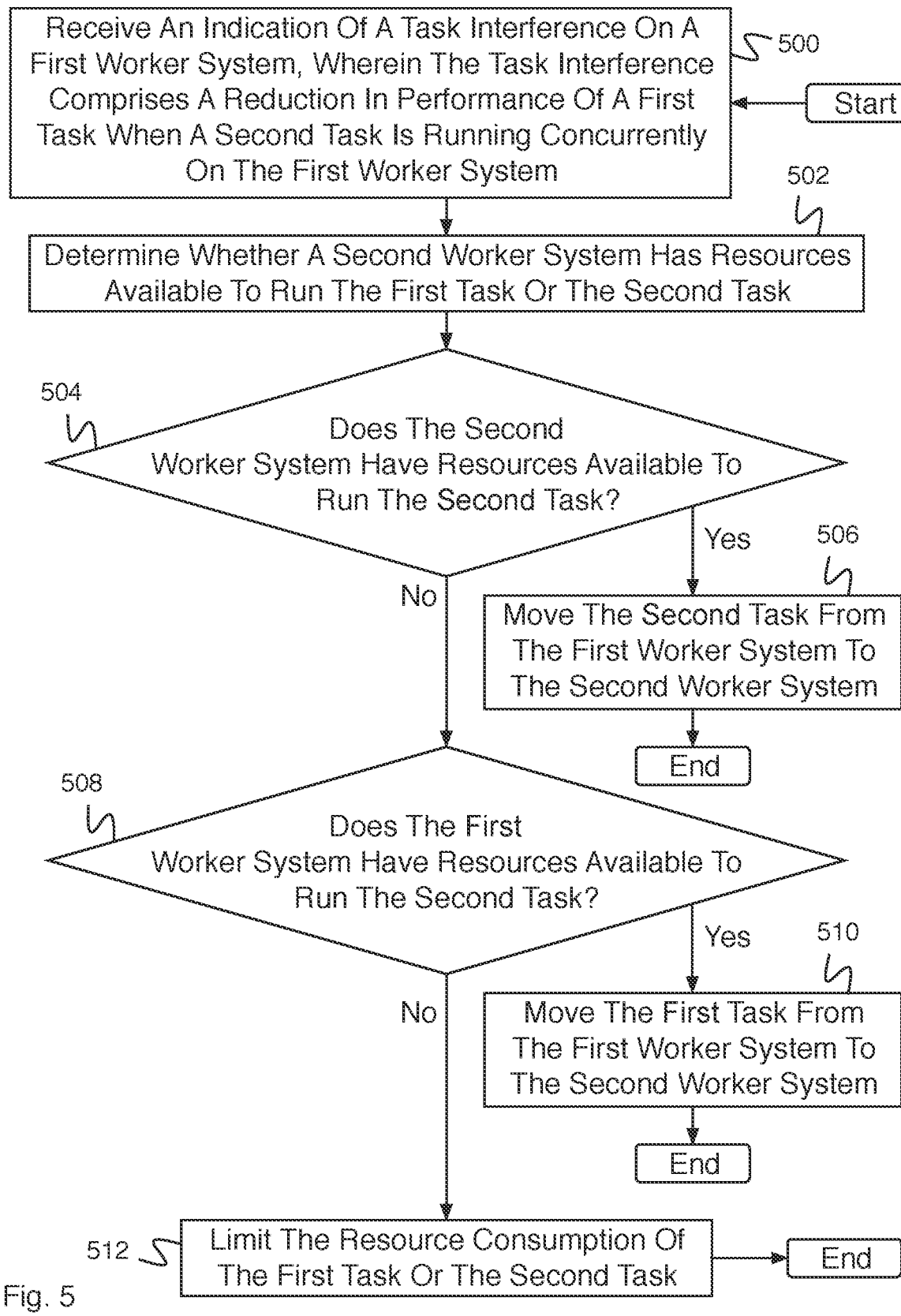
FIG. 5 is a flow diagram illustrating an embodiment of a process for resolving cluster computing task interference.

FIG. 5 is a flow diagram illustrating an embodiment of a process for resolving cluster computing task interference. In some embodiments, the process of FIG. 5 is executed by cluster computing system 104 of FIG. 1. In the example shown, in 500, an indication is received of a task interference on a first worker system, wherein the task interference comprises a reduction in performance of a first task when a second task is running concurrently on the first cluster machine. For example, the first worker system comprises a worker system of a plurality of worker systems. In 502, it is determined whether a second worker system has resources available to run the first task or the second task. For example, the second worker system comprises a worker system of the plurality of worker systems. In 504, it is determined whether the second worker system has resources available to run the second task. In some embodiments, the first task has been running longer, so assuming same task priority the second task should be tried first. In the event that a priority is configured the priority of the task determines which task is tried first (e.g., lowest priority is moved first). In the event it is determined that the second worker system of the plurality of worker system has resources available to run the second task, control passes to 506. In 506, the second task is moved from the first worker system to the second worker system, and the process ends. In the event it is determined in 504 that the second worker system does not have resources available to run the second task, control passes to 508. In 508, it is determined whether the second worker system has resources available to run the first task. In the event it is determined that the second worker system has resources available to run the first task, control passes to 510. In 510, the first task is moved from the first worker system to the second worker system, and the process ends. In the event it is determined in 508 that the second worker system does not have resources available to run the first task, control passes to 512. In 512 the resource consumption of the first task or the second task is limited.

In some embodiments, the indication of task interference comprises an indication of a sudden reduction in resource performance. In some embodiments, the indication of task interference comprises an indication of a sudden reduction in performance of one or more key tasks. For example, the task interference consumes all available capacity of a resource, causing performance of a key task to drop even though the key task is not a large consumer of the resource. In some embodiments, an indication of a task interference comprises an indication that a combined resource utilization of a first task and a second task both running on the worker system is greater than the resource capacity of the worker system.

In some embodiments, the system is additionally configured to add the indication of task interference and resource utilization to a task interference database (e.g., task interference database 208 of FIG. 2).

In some embodiments, the first task or the second task comprises part of a task group (e.g., a set of instances of the same task or related tasks). In some embodiments, in the event the process moves a task comprising part of a task group, all tasks comprising part of the task group are moved.

In some embodiments, the system is additionally configured to receive an indication of a system performance target (e.g., a time to complete a task, a data throughput rate, etc.). In some embodiments, a limit on the resource consumption of the first task or the second task is based at least in part on the performance target (e.g., the resource consumption of the task is not limited so much that the task performance is reduced below the performance target). In some embodiments, in the event the limit is below a requirement for the performance target, a new cluster machine is allocated for the task.

Figure 6:
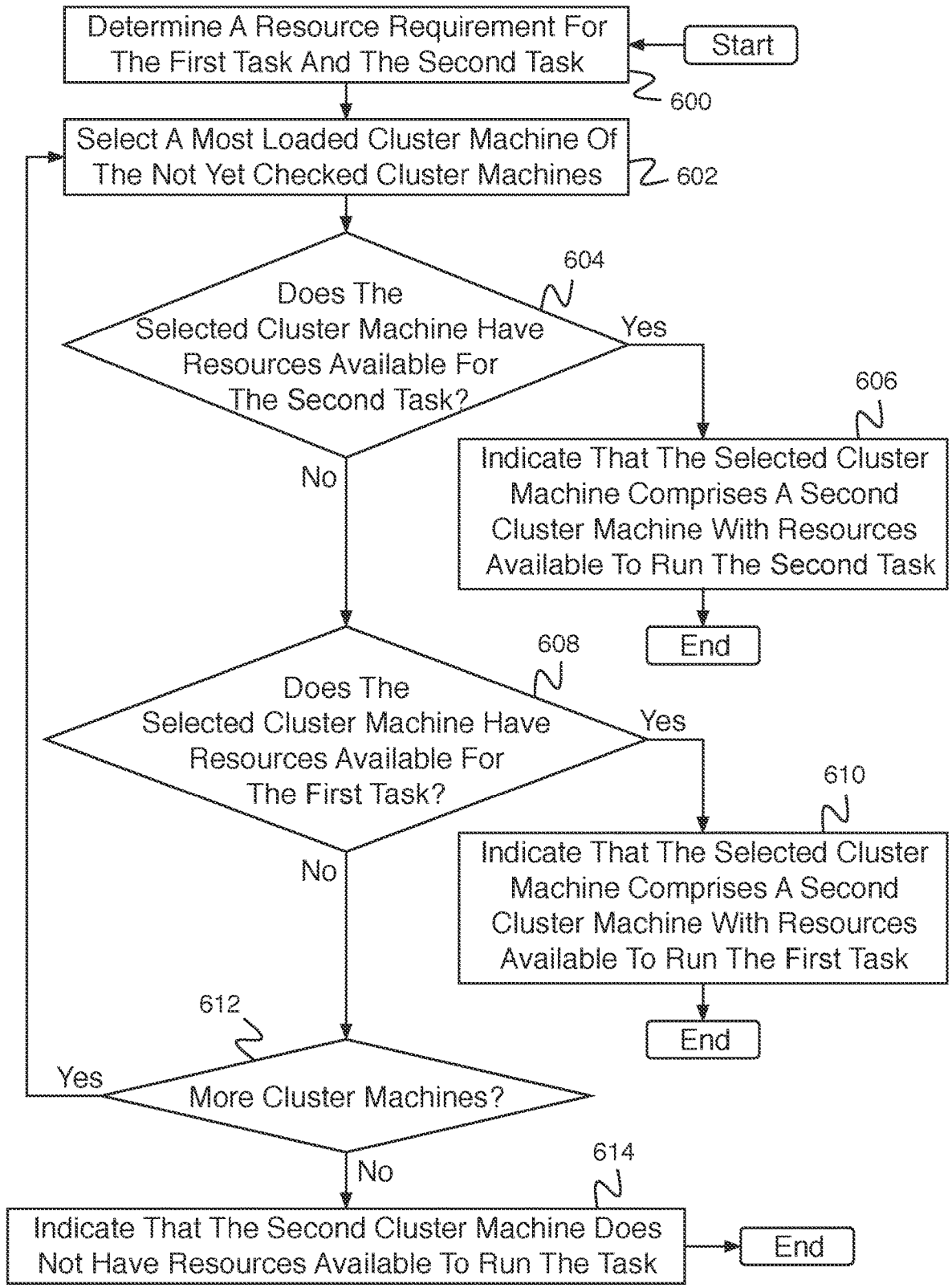
FIG. 6 is a flow diagram illustrating an embodiment of a process for determining whether a worker system has resources available to run a first task or a second task.

FIG. 6 is a flow diagram illustrating an embodiment of a process for determining whether a worker system has resources available to run a first task or a second task. In some embodiments, the process of FIG. 6 implements 502 of FIG. 5. In the example shown, in 600, a resource requirement for the first task and the second task is determined. In 602, a most loaded cluster machine of the not yet checked cluster machines is selected. In 604, it is determined whether the selected cluster machine has resources available for the second task. In the event it is determined that the selected cluster machine has resources available for the second task, control passes to 606. In 606, the process indicates that the selected cluster machine comprises a second cluster machine with resources available to run the second task, and the process ends. In the event it is determined in 604 that the selected cluster machine does not have resources available for the second task, control passes to 608. In 608, it is determined whether the selected cluster machine has resources available for the first task. In the event it is determined that the selected cluster machine has resources available for the first task, control passes to 610. In 610, the process indicates that the selected cluster machine comprises a second cluster machine with resources available to run the first task, and the process ends. In the event it is determined in 608 that the second cluster machine does not have resources available for the first task, control passes to 612. In 612, it is determined whether there are more cluster machines. For example, more cluster machines not yet selected in 602. In the event it is determined that there are more cluster machines, control passes to 602. In the event it is determined that there are not more cluster machines, control passes to 614. In 614, the process indicates that the second cluster machine does not have resources available to run the task.

Figure 7:
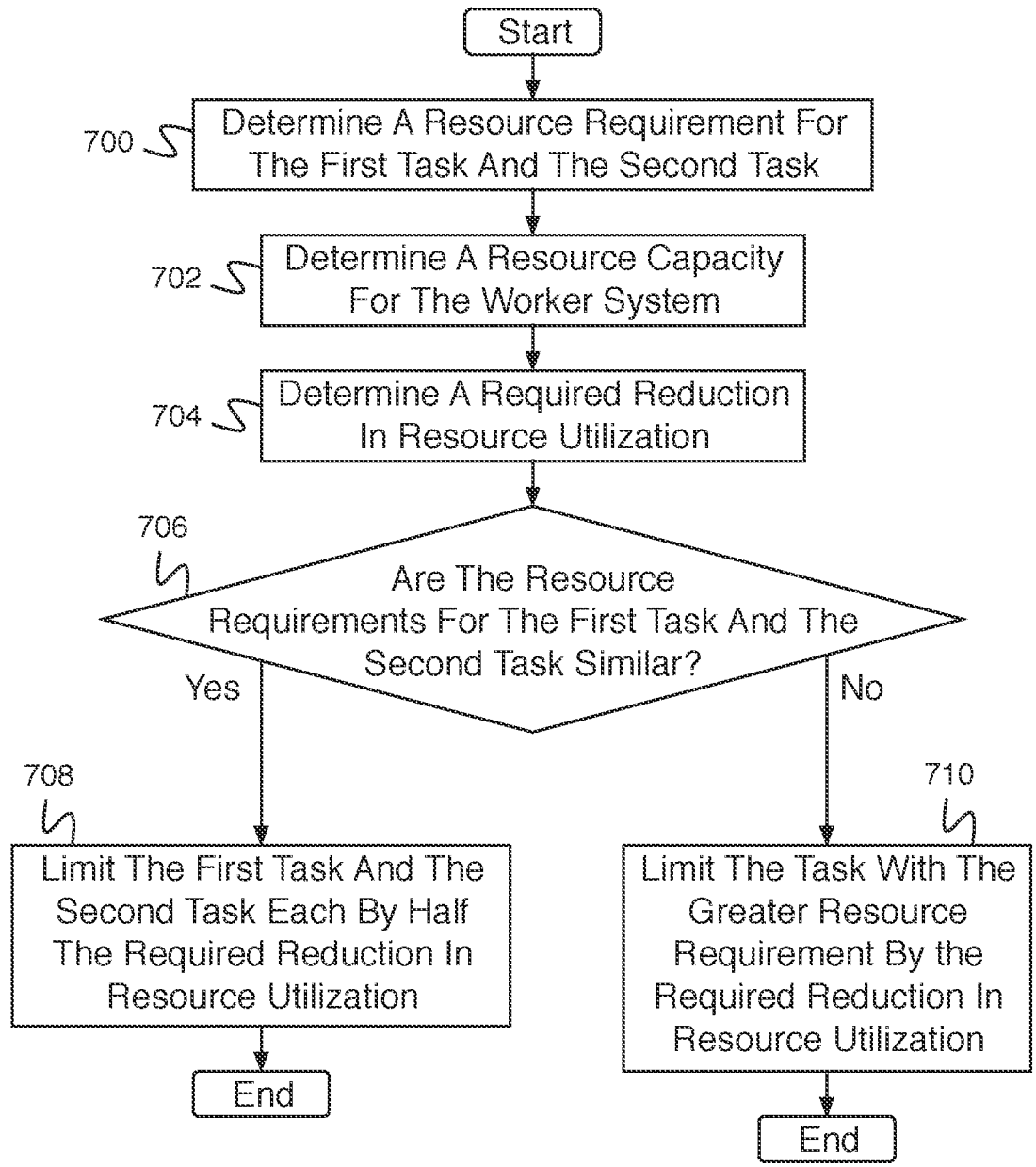
FIG. 7 is a flow diagram illustrating an embodiment of a process for limiting a resource consumption of a first task and a second task.

FIG. 7 is a flow diagram illustrating an embodiment of a process for limiting a resource consumption of a first task and a second task. In some embodiments, the process of FIG. 7 implements 512 of FIG. 5. In the example shown, in 700, a resource requirement is determined for the first task and the second task. For example, the resource requirement is determined from a task interference database, a resource usage history, etc. In 702, a resource capacity for the worker system is determined. In 704, a required reduction in resource utilization is determined. For example, the required reduction in resource utilization comprises the difference in the resource capacity for the cluster machine and the combined resource requirement for the first task and the second task. The required reduction for the worker system may be enough to reduce the combined resource usage of the first task and the second task to an amount below the resource capacity for the worker system (e.g., leaving extra resource capacity for tasks other than the two interfering tasks to use). In 706, it is determined whether the resource requirements for the first task and the second task are similar. For example, the resource requirements for the first task and the second task are similar in the event they are within 1% of each other, within 5% of each other, within 10% of each other, within 25% of each other, etc. In the event it is determined that the resource requirements for the first task and the second task are similar, control passes to 708. In 708, the first task and the second task are each limited by half the required reduction in resource utilization, and the process ends. In the event it is determined in 706 that the resource requirements for the first task and the second task are not similar, control passes to 710. In 710, the task with the greater resource requirement is limited by the required reduction in resource utilization. In some embodiments, the required reduction in resource utilization is divided between the first task and the second task proportionately to their resource requirements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for resolving interference on a cluster computing system, comprising:
an input interface configured to:
receive an indication of a task interference on a first worker system of a plurality of worker systems, wherein the task interference comprises a reduction in performance of a first task when a second task is running concurrently on the first worker system; and
a processor configured to:
determine whether a second worker system of the plurality of worker systems has resources available to run the first task or the second task based on a first priority associated with the first task and a second priority associated with the second task;
in response to determining that the second worker system has the resources available to run the second task:
move the second task from the first worker system to the second worker system;
in response to determining that the second worker system has the resources in response to determining that the second worker system has the resources available to run the second task:
move the first task from the first worker system to the second worker system;
in response to determining that the second worker system does not have the resources available to run the first task or the second task:
limit a resource allocation of the first task or the second task; and
move all tasks of a task group, wherein the task group comprises a subset of a set of tasks comprising multiple instances of the same task.

2. The system of claim 1, wherein the indication of task interference comprises an indication of a sudden reduction in a resource performance.

3. The system of claim 1, wherein the task interference comprises an indication of a sudden reduction in performance of one or more key tasks.

4. The system of claim 1, wherein an indication of a task interference comprises an indication that a combined resource utilization of a first task and a second task both running on the first worker system is greater than a resource capacity of the first worker system.

5. The system of claim 1, wherein limiting the resource allocation of the first task or the second task comprises limiting the resource allocation of the first task and/or the second task.

6. The system of claim 1, wherein a task resource allocation is unlimited by default.

7. The system of claim 1, wherein a resource of the resources comprises a network bandwidth, a disk bandwidth, a memory bandwidth, or a processor cache.

8. The system of claim 1, wherein the second worker system comprises a most loaded worker system of the plurality of worker systems that has the resources available to run the second task.

9. The system of claim 1, wherein the second worker system comprises a most loaded worker system of the plurality of worker systems that has the resources available to run the first task.

10. The system of claim 1, wherein determining that the second worker system does not have the resources available to run the first task or the second task comprises determining that no worker system of the plurality of worker systems has resources available to run the first task or the second task.

11. The system of claim 1, wherein the processor is additionally configured to add the indication of task interference to a task interference database.

12. The system of claim 11, wherein the task interference database comprises information describing a plurality of task interference events.

13. The system of claim 12, wherein the task interference database is used by the computing cluster for allocating tasks to worker systems of the plurality of worker systems with reduced interference.

14. The system of claim 1, wherein the processor is further configured to receive an indication of a performance target for the first task.

15. The system of claim 14, wherein limiting a resource is based at least in part on the performance target.

16. The system of claim 15, wherein the processor is further configured to, in the event a limit is below a requirement for the performance target, allocate a new cluster machine for the first task.

17. A method for resolving interference on a cluster computing system, comprising:
- receiving an indication of a task interference on a first worker system of a plurality of worker systems, wherein the task interference comprises a reduction in performance of a first task when a second task is running concurrently on the first worker system;
- determining, using a processor, whether a second worker system of the plurality of worker systems has resources available to run the first task or the second task based on a first priority associated with the first task and a second priority associated with the second task;
- in response to determining that the second worker system has the resources available to run the second task:
  - moving the second task from the first worker system to the second worker system;
- in response to determining that the second worker system has the resources available to run the first task and does not have resources available to run the second task:
  - moving the first task from the first worker system to the second worker system;
- in response to determining that the second worker system does not have the resources available to run the first task or the second task:
  - limiting a resource allocation of the first task or the second task; and
- moving all tasks of a task group, wherein the task group comprises a subset of a set of tasks comprising multiple instances of the same task.

18. A computer program product for resolving interference on a cluster computing system, the computer program product being embodied in a non-transitory computer readable storage medium and comprising computer instructions for:
- receiving an indication of a task interference on a cluster machine of a plurality of cluster machines comprising a computer cluster running a set of tasks;
- receiving an indication of a task interference on a first worker system of a plurality of worker systems, wherein the task interference comprises a reduction in performance of a first task when a second task is running concurrently on the first worker system;
- determining whether a second worker system of the plurality of worker systems has resources available to run the first task or the second task based on a first priority associated with the first task and a second priority associated with the second task;
- in response to determining that the second worker system has the resources available to run the second task:
  - moving the second task from the first worker system to the second worker system;
- in response to determining that the second worker system has the resources available to run the second task:
  - moving the first task from the first worker system to the second worker system;
- in response to determining that the second worker system does not have the resources available to run the first task or the second task:
  - limiting a resource allocation of the first task or the second task; and
- moving all tasks of a task group, wherein the task group comprises a subset of a set of tasks comprising multiple instances of the same task.

\* \* \* \* \*